No. 730,673. PATENTED JUNE 9, 1903.
A. D. LUNT.
METHOD OF GENERATING ALTERNATING CURRENTS.
APPLICATION FILED AUG. 25, 1899.
NO MODEL.

WITNESSES.
A. Ernst Altenpohl
B. B. Hull

INVENTOR.
Alexander D. Lunt.
by Albert G. Davis
Att'y.

No. 730,673.

Patented June 9, 1903.

UNITED STATES PATENT OFFICE.

ALEXANDER D. LUNT, OF SCHENECTADY, NEW YORK, ASSIGNOR TO GENERAL ELECTRIC COMPANY, A CORPORATION OF NEW YORK.

METHOD OF GENERATING ALTERNATING CURRENTS.

SPECIFICATION forming part of Letters Patent No. 730,673, dated June 9, 1903.

Application filed August 25, 1899. Serial No. 728,411. (No model.)

*To all whom it may concern:*

Be it known that I, ALEXANDER D. LUNT, a citizen of the United States, residing at Schenectady, county of Schenectady, State of New York, have invented certain new and useful Improvements in Methods of Generating Alternating Currents, of which the following is a specification.

Heretofore in cases where single-phase alternating currents are changed into or are produced from other alternating currents differing in phase or frequency, or both, the current or currents resulting from the change are composed of a fundamental wave and a wave or waves of higher frequency of such nature as to render the resultant wave of irregular frequency, varying from period to period. Such currents are unsuitable for many purposes—as, for instance, the operation of synchronous motors, rotary converters, or other machines which are sensitive to variations in frequency of current and by reason of this sensitiveness are set into oscillation or, in other words, caused to hunt.

My invention aims to do away with the objections mentioned by producing alternating current of uniform frequency from another alternating current of uniform frequency, either single phase or multiphase.

The details of my invention and the mode of putting the same into practice will be better understood by reference to the following description, taken in connection with the accompanying drawings, while its scope will be particularly pointed out in the appended claims.

Figure 1:
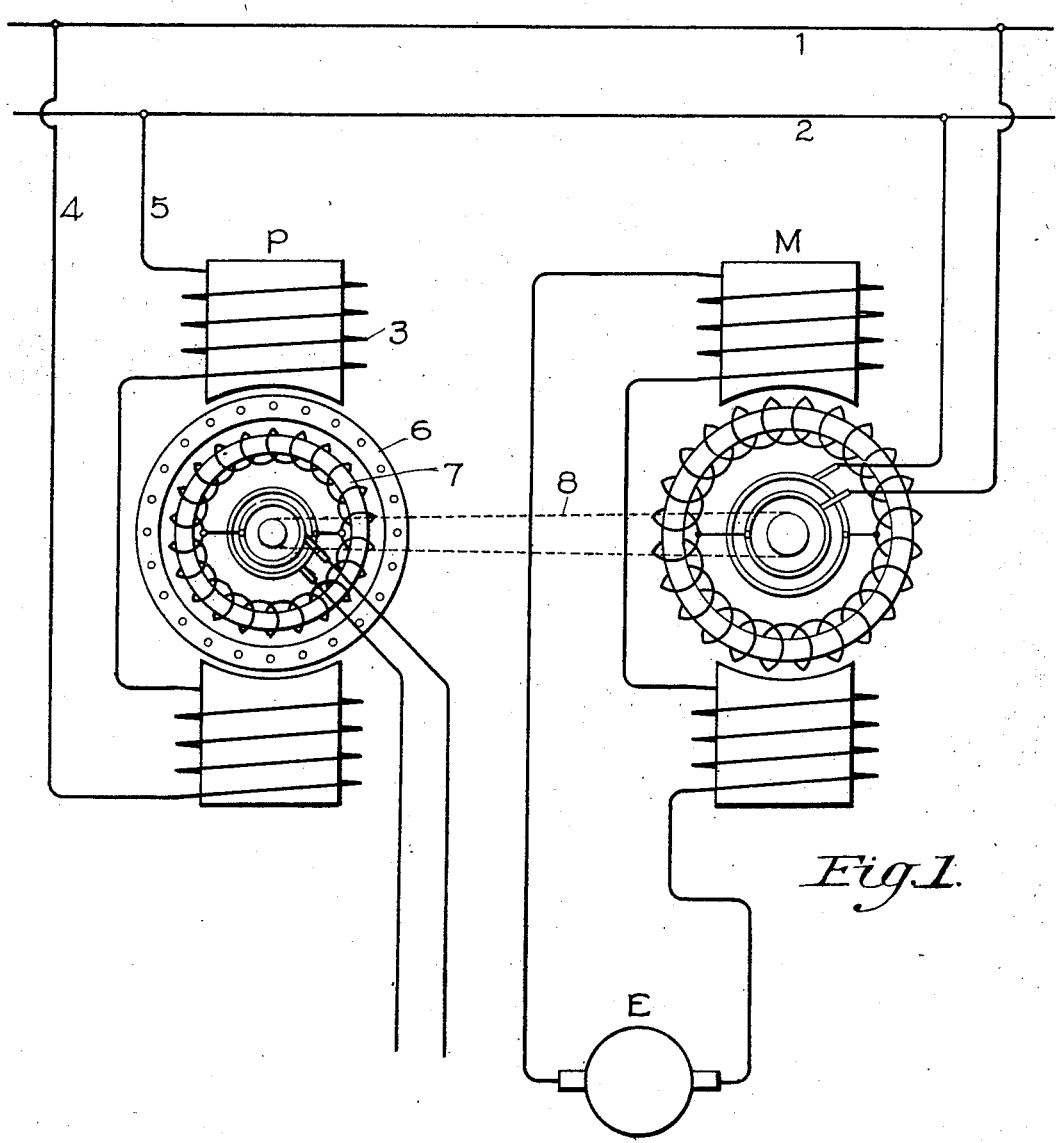
Figure 2:
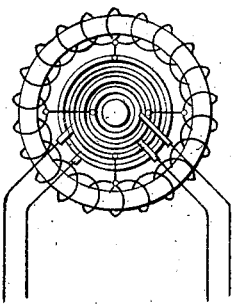

Figure 1 represents in diagram one embodiment of my invention, and Fig. 2 a modified detail.

In the drawings, 1 and 2 indicate conductors upon which single-phase electromotive forces are maintained. The machine by which the phase or frequency of the alternating current is to be changed is indicated at P. This machine is provided with a field-magnet structure 3, which, although shown in diagram in the drawings, is, however, of any suitable form—as, for example, like that employed in connection with ordinary alternating-current motors of the single-phase type. The windings of the field-magnet structure 3 are connected with the single-phase conductors 1 2 by means of suitable leads 4 5, as shown. Within the influence of the field are two rotating armatures, one of which is of the squirrel-cage type and is shown at 6, while the other is provided with a definite winding and is indicated at 7. Both armatures have the same axis of rotation, and one of the armatures is placed between the other armature and the field-magnet structure 3. In the construction shown the squirrel-cage armature 6 is arranged so as to surround the definitely-wound armature 7.

The last-mentioned armature has its winding tapped at suitable points and connected to collector-rings carried by the armature-shaft. The winding may be tapped so as to produce or consume either single-phase current or multiphase current, as may be desired. I have indicated in Fig. 1 the connections corresponding to the single-phase arrangement; but it will be evident that the connections might equally as well be made for a multiphase current of any number of phases. By way of example I have indicated in Fig. 2 the additional connections and collector-rings to be used in conjunction with the armature 7 in Fig. 1, where it is desired either to produce or consume two-phase currents. Where I have used the terms "produce" and "consume" or their equivalents in the above description, I do so with a view to making clear the fact that the apparatus described is reversible in function and may be used for altering the character of a single-phase current, thereby producing another current, either of different phase or different frequency, or both, or for performing the reverse operation.

In operating the machine P it is necessary that the definitely-wound armature 7 be maintained in rotation relatively to its field-magnet at some predetermined rate, either above or below that corresponding to the frequency of the current supplied to the machine. Any suitable means may be employed for effecting this result; but for reasons of economy, as well as convenience, I find it desirable to employ for this purpose a synchronous motor supplied with energy from a suitable source. This motor I have shown in the drawings at M, the armature of the motor being connected with the alternating mains 1 2, while the field is excited from any suitable source of direct current—as, for example, an exciter E. The machine M is to be connected with the machine P, so as to maintain the latter machine at the speed desired. This result may obviously be secured in many different ways—as, for example, by directly connecting the two machines and making the number of poles of the machine M such as to correspond with the speed desired or by a belt running over pulleys of suitable relative diameters or in other well-known ways. As symbolical of a suitable mechanical connection I have indicated a belt in dotted lines at 8. In the arrangement shown the pulley on the machine P is of smaller diameter than that on the machine M in order to cause the armature 7 to rotate at a speed higher than that corresponding to synchronism. It is to be understood, however, that the speed of the machine 7 is to be chosen according to the results to be accomplished.

Let it be supposed that the field of the machine P is excited by single-phase alternating current. An alternating magnetomotive force is thus set up between the pole-pieces of the machine. If under these circumstances the flux-screen be given an initial rotation, it will accelerate in speed until it closely approximates synchronism, thereby causing the alternating currents set up in the bars of the squirrel-cage to react upon the impressed magnetomotive force, so as to produce a resultant field indistinguishable from the rotary field produced in a multiphase machine. Within this field the armature 7 is caused to rotate at a predetermined relative speed, thereby setting up currents in its windings of a frequency corresponding to the difference between the speeds of rotation of the rotary field and the armature 7. The currents produced in the winding of the armature 7 may be conducted to a consumption circuit or circuits in the usual manner by the employment of suitable collector-rings, brushes, and coöperating connections in a manner well understood and as indicated diagrammatically in the drawings.

It is to be noted that with a given speed of its armature 7 the machine P may be caused to yield currents of either of two frequencies, dependent upon the direction in which the flux-screen 6 is set into rotation. With a fixed direction of rotation of the armature 7 the currents set up in its winding are of a frequency corresponding approximately to the sum of the speeds of rotation of the armature 7 and flux-screen 6 when they rotate in opposite directions and to their difference in speeds when they rotate in the same direction. More accurately speaking, the currents are of a frequency exactly equal to the difference in speed of rotation of the armature 7 and the field in which it rotates. Thus with a given arrangement of apparatus it is possible to produce at will a current of a frequency higher or lower than that supplied to the machine, depending upon the direction in which the flux-screen is rotated initially.

The action of the device may also be explained upon the theory of two oppositely-rotating magnetomotive forces due to the single-phase current flowing. The flux-screen when at rest is acted upon equally by these magnetomotive forces, but when in rotation the currents set up in its conductors react unequally upon the magnetomotive forces and cause one of them to be practically suppressed when the flux-screen is rotating at full speed, thereby producing a uniformly-rotating flux, due to the other magnetomotive force, within the influence of which flux the frequency-changer armature 7 is rotated as described.

Some additional actions take place in the operation of the frequency-changer, as illustrated in the drawings. When the armature 7 of the frequency-changer proper is rotated below synchronism, the machine has a positive torque, thus acting to drive the synchronous machine M as a generator and cause energy to be returned to the line. On the other hand, when the frequency-changer is driven above synchronism—that is, in the same direction, but at a higher speed than that of the impressed rotating field—the machine acts as an induction-generator. The synchronous machine M then acts as a motor, and the energy expended by it, neglecting minor losses, is returned to the line through the medium of the frequency-changer, due to its action as an induction-generator.

What I claim as new, and desire to secure by Letters Patent of the United States, is—

1. The method of changing the frequency of a single-phase alternating current which consists in producing by said current an alternating magnetic field, neutralizing one of the rotary components of said alternating magnetic field and rotating a conductor in the resultant field at a definite speed, thereby inducing therein an alternating electromotive force of a frequency dependent upon the relative motion of the resultant field and said conductor.

2. The method of changing the frequency of a single-phase alternating current which consists in deriving from said current a rotary magnetic field, and rotating a conductor in said rotary field at a definite speed thereby inducing in said conductor an alternating current of a frequency dependent upon the relative motion of the rotary field and said conductor.

3. The method which consists in deriving a rotary magnetic field from a single-phase magnetomotive force and rotating a conductor in said magnetic field at a definite speed.

4. The method which consists in deriving a rotary magnetic field from a single-phase magnetomotive force and producing by the rotation of conductors in said rotary magnetic field a multiphase alternating current of a frequency bearing a definite ratio to the frequency of said single-phase magnetomotive force.

5. The method which consists in deriving a uniformly-rotating magnetic field from a single-phase magnetomotive force, and causing a uniform asynchronous relative rotation of a conductor in said magnetic field.

6. The method which consists in deriving from a single-phase magnetomotive force, a rotating magnetic field of substantially uniform value, and causing a fixed speed of relative rotation between a conductor and said magnetic field.

7. The method which consists in producing a single-phase magnetomotive force, suppressing one of the rotary components of said magnetomotive force, and positively rotating a conductor in the resulting field with a frequency bearing a fixed ratio to the frequency of variation of said magnetomotive force.

In witness whereof I have hereunto set my hand this 22d day of August, 1899.

ALEXANDER D. LUNT.

Witnesses:
BENJAMIN B. HULL,
MABEL E. JACOBSON.